United States Patent [19]
Schierling et al.

[11] Patent Number: 4,809,830
[45] Date of Patent: Mar. 7, 1989

[54] TORQUE TRANSMITTING TORSIONAL VIBRATION DAMPER DEVICE

[75] Inventors: Bernhard Schierling, Kürnach; Manfred Caspar, Schwalbach-Elm; Harald Raab, Schweinfurt; Franz Hartig, Dittelbrunn; Norbert Pieper, Lengerich i.W.; Wolfgang Grosspietsch, Schweinfurt, all of Fed. Rep. of Germany

[73] Assignee: Fichtel & Sachs AG

[21] Appl. No.: 38,286

[22] Filed: Apr. 14, 1987

[30] Foreign Application Priority Data

Apr. 26, 1986 [DE] Fed. Rep. of Germany ....... 3614158

[51] Int. Cl.$^4$ .............................................. F16D 3/66
[52] U.S. Cl. .................. 192/3.29; 192/106.2; 464/68
[58] Field of Search .................. 192/106.2, 3.28, 3.29; 464/64, 68

[56] References Cited

U.S. PATENT DOCUMENTS

| 2,574,573 | 11/1951 | Libby . | |
| 4,139,995 | 2/1979 | Lamarche | 464/64 |
| 4,279,132 | 7/1981 | Lamarche | 192/106.2 X |
| 4,376,477 | 3/1983 | Loizeau | 192/106.2 |
| 4,484,898 | 11/1984 | Kohno | 192/106.2 X |
| 4,585,427 | 4/1986 | Lamarche | 192/106.2 X |
| 4,645,053 | 2/1987 | Kitayama | 192/106.2 |
| 4,662,239 | 5/1987 | Worner et al. | 192/106.2 X |
| 4,663,983 | 5/1987 | Kobayashi | 192/106.2 X |
| 4,687,087 | 8/1987 | Tebbe | 192/106.2 |

FOREIGN PATENT DOCUMENTS

| 0061827 | 10/1982 | European Pat. Off. . | |
| 0196760 | 10/1986 | European Pat. Off. . | |
| 2166604 | 8/1973 | France . | |
| 2154701 | 9/1985 | United Kingdom | 464/68 |

Primary Examiner—Rodney H. Bonck
Attorney, Agent, or Firm—Toren, McGeady & Associates

[57] ABSTRACT

In a torque transmitting torsional vibration damper device for use in a torque transmission path of a motor vehicle between the engine and the gear box a central plate is provided. Two sides plates are provided on both sides of the central plate. The side plates are interconnected for common rotation. Each of the central plate and the side plates is provided with at least two circumferentially extending windows. Respective windows of the central plate and the side plates are aligned in axial direction. Each group of mutually aligned windows receives a pair of torque transmitting compressional springs arranged in series and spaced in circumferential direction. Said discs are provided between the central plate and the side plates. These sides discs are used for circumferential torque transmission between mutually adjacent ends of the compressional springs of each pair. The side discs are supported in radial direction only by engagement with the compressional springs.

4 Claims, 4 Drawing Sheets

TORQUE TRANSMITTING TORSIONAL VIBRATION DAMPER DEVICE

BACKGROUND OF THE INVENTION

Torque transmitting torsional vibration damper devices are frequently used in the torque transmission path of a motor vehicle between an engine and a gear box for damping torsional vibrations. Such devices may be used e.g. in clutch units which are used for bridging the pump wheel and the turbine wheel of a hydrodynamic torque converter. Further, such devices may be used for torque transmission between a primary flywheel and a secondary flywheel of a two-part flywheel unit. Further, such devices may be used as integrated in a clutch disc of a conventional motor vehicle clutch.

This invention relates to an improvement of such a torque transmitting torsional vibration damper device.

STATEMENT OF THE PRIOR ART

From U.S. Pat. No. 2,574,573, a torsional vibration damper integrated into a clutch disc is known. The clutch disc comprises a central hub with a hub flange. On one side of the hub flange there is provided a clutch disc body. On the other side of the hub flange there is provided a side plate. The side plate is interconnected with the clutch disc body by rivets. Each of the hub disc body, the side plate and the hub flange are provided with circumferentially extending windows. Respective windows of the hub disc body, the side plate and the hub flange are in axial alignment when the clutch disc unit is not loaded in the torsional sense. Respective windows of the clutch disc body, the side plate and the hub flange receive a pair of torque transmitting compressional springs arranged in series and spaced in circumferential direction. A star-shaped member is located axially between each side of the hub flange on the one hand and the clutch disc body and the side plate on the other hand. These star-shaped members are interconnected with each other for common angular movement with respect to the hub flange on the one hand and the clutch disc body and the side plate on the other hand. The radially extending arms of the star-shaped members engage between the mutually adjacent ends of the compressional springs of each pair of compressional springs. So, the star-shaped members are useful for force transmission between mutually adjacent compressional springs of each pair of compressional springs. The star-shaped members are supported in radial direction on the hub member. So an uncontrollable friction arises between the hub member and the star-shaped members on angular relative movement thereof.

OBJECT OF THE INVENTION

It is an object of the present invention to provide a torque transmitting torsional vibration damper device of the known type which is more sensitive to torsional vibrations and avoids uncontrollable internal friction or reduces such friction to a minimum amount.

SUMMARY OF THE INVENTION

A torque transmitting torsional vibration damper device, particularly for use in a torque transmission path of a motor vehicle between an engine and a gear box comprises a first torque transmission unit and a second torque transmission unit having a common axis. Each of said torque transmission units is provided with at least two circumferentially extending windows. Respective windows of said first torque transmission unit and said second torque transmission unit are substantially aligned in axial direction in non-loaded condition of the torsional vibration damper device. Each group of mutually aligned windows receives a pair of torque transmitting compressional springs arranged in series and spaced in circumferential direction. An intermediate torque transmission unit common to said pairs of compressional springs is provided for circumferential force transmission between mutually adjacent ends of the compressional springs of each pair of compressional springs. The intermediate torque transmission unit is supported in radial direction only by engagement with the compressional springs.

By the freely floating arrangement of the intermediate torque transmission unit which is based on the feature that this intermediate torque transmission unit is supported in radial direction only by engagement with the compressional springs, unnecessary friction in the total system is reduced. It is possible but it is not absolutely necessary that the axial positioning of the intermediate torque transmission unit is also established through the compressional springs. The intermediate torque transmission unit has no substantial friction under the high-frequency torsional vibrations even when axial positioning of the intermediate torque transmission unit is obtained by axial contact of the intermediate torque transmission unit with one of the first and the second torque transmission unit.

The positioning of the intermediate torque transmission unit exclusively by engagement with the compressional spring is possible because the intermediate torque transmission unit may radially engage the compressional springs at least at the circumferentially spaced end portions thereof.

Preferably, the windows are substantially equidistantly distributed along a circumferential line about the axis of the device. Due to this feature the radial positioning of the intermediate torque transmission unit is still improved.

In view of a precise engagement of the intermediate torque transmission unit and the compressional springs, the torque transmission unit may be provided with windows receiving respective single compressional springs of said pairs of compressional springs. These windows are preferably adapted in shape to the shape of the compressional springs.

In order to obtain a symmetrical construction, the first torque transmission unit may comprise a central annular plate member having a middle plane perpendicular to the axis of the device. This middle plane substantially coincides with circumferentially extending axes of the compressional springs. The second torque transmission unit may be provided in such case with two mutually interconnected side plates on both sides of the central plate. The intermediate torque transmission unit can also be provided with two mutually interconnected side discs provided on both sides of the central plate. An uncontrolled frictional arrangement of the side discs with the central plate and with the side plates may be completely avoided in that an axial space is provided between the side discs on the one hand and the central plate and the side plates on the other hand. The axial positioning of the side discs may be achieved by the windows of the side discs narrowly surrounding the respective torsional springs.

The various features of novelty which characterize invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

The invention will be explained in greater detail hereinafter with reference to the embodiments shown in the accompanying drawings, in which.

DESCRIPTION OF THE PREFERRED EMBODIMENTS

Figure 1:
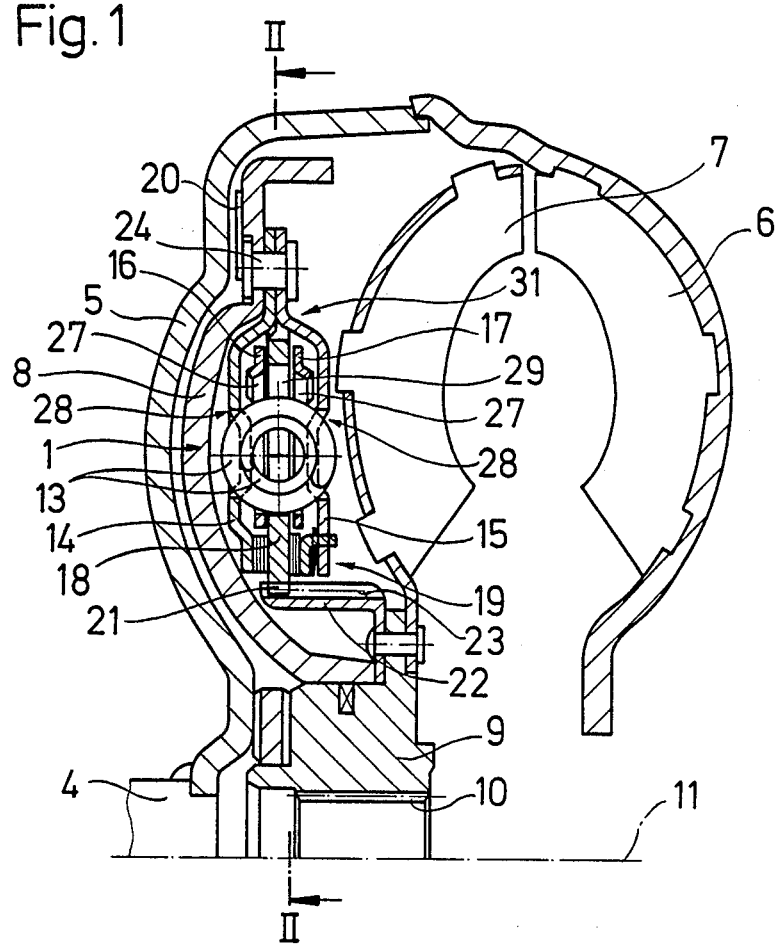
FIG. 1 shows a longitudinal section through a hydraulic torque converter in which a torsional vibration damper device of the present invention is integrated.

As one can see from FIG. 1, the torsional vibration damper device 1 is provided on the piston 8 of a bridging clutch of a hydrodynamic torque converter. Only parts of the hydrodynamic torque converter are illustrated. The hydrodynamic torque converter is except for the torsional vibration damper device of well-known construction, so that a complete illustration of the hydrodynamic torque converter is not necessary. The hydrodynamic torque converter comprises a housing 5 which is connected for common rotation with the crank shaft 4 of a internal combustion engine. The total unit is rotatable about a rotational axis 11. Blades of the pumping wheel 6 are fastened to the housing 5. Opposite to the blades of the pump wheel 6 a turbine wheel 7 is provided in a substantially symmetrical position. This turbine wheel 7 is also provided with blades. The turbine wheel 7 is mounted on a hub 9 which is in driving engagement with a not shown shaft connecting the turbine wheel with the input end of a gear box. For engagement of the hub 9 with this shaft radially inner teeth 110 are provided on the hub 9. On the hub 9 there is further fastened an annular member 22 with outer teeth 23. The output unit 18 of the torsional vibration damper device 1 engages by an inner teeth arrangement 21 into the teeth 23. The side plates 14, 15 of an input unit 14, 15 of the torsional vibration damper device are fastened by rivets 24 on the piston 8. The piston 8 is provided with a friction coating 20 which can come into frictional engagement with an inner side face of the housing 5 by fluid pressure acting on the right-hand side of the piston 8.

For avoiding relative rotation between the pump wheel 6 and the turbine wheel 7 at least in the range of higher velocities of a motor vehicle, the bridging clutch is operated. For operation of the friction clutch fluid pressure is admitted to the right-hand side of the piston 8, such that the friction coating 20 engages the housing 5 and that the housing 5 and the piston 8 rotate as a unit with equal number of revolutions. By this operation of the clutch the torque transmission from the crank shaft 4 to the housing 5 through the piston 8 and the torsional vibration damper device is established. From the torsional vibration damper device 1 the torque is transmitted through the ring member 22 and the hub 9 onto the shaft connected with the input side of the gear box (not shown).

The torsional vibration damper device itself comprises a central output plate 18 which has a middle plane substantially coinciding with the circumferential axes of the compressional springs 13. This central output plate 18 is connected for common rotation with the ring member 22 but is axially movable with respect thereto. On both sides of the central output plate 18 and in axial distance therefrom there are provided intermediate discs 16, 17 forming an intermediate torque transmission unit 16, 17. These intermediate discs 16, 17 are only used for circumferential force transmission between the compressional springs of respective pairs of springs 13. These intermediate discs are radially and axially positioned by the compressional springs 13. The function of these intermediate discs 16, 17 will be further explained in connection with FIG. 2. On both sides of the intermediate discs 16, 17 there are provided input side plates 14, 15 which form an input torque transmission unit 14, 15. These input side plates 14, 15 are connected by rivets 24 with the piston 8 at a location radially outwards of the compressional springs. Radially inwards of the compressional springs 13 and of the intermediate side plates 16, 17 a friction device 19 is provided operationally between the input side plates 14, 15 and the output central plate 18. The arrangement of the compressional springs and of the windows receiving these compressional springs in the input central plate, the output side plates and the intermediate side discs is more particularly illustrated in FIG. 2.

Figure 2:
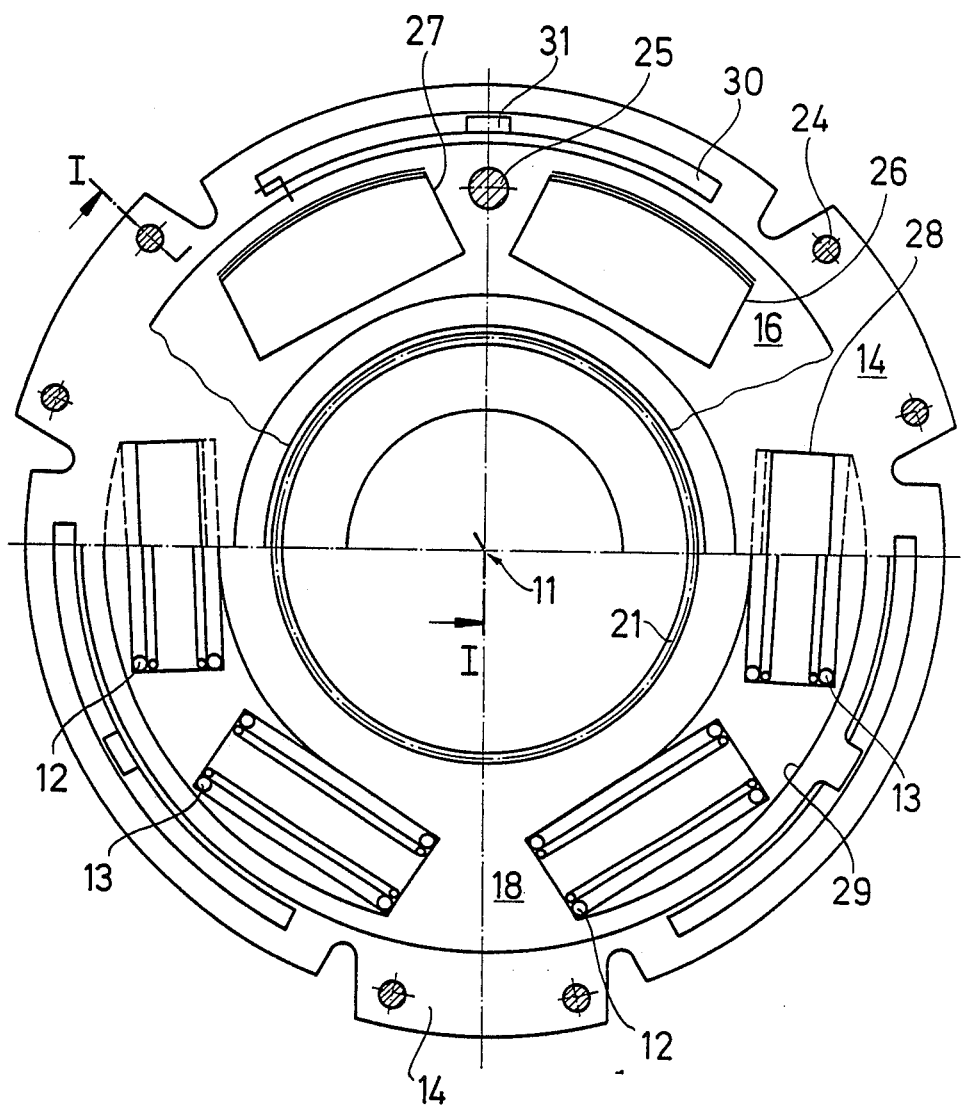
FIG. 2 is a section according to line II—II of FIG. 1.

FIG. 2 shows a section according to line II—II of FIG. 1. In the upper half of FIG. 2 there is shown the shape of the windows 26, 27 provided in the intermediate side discs 16, 17. The compressional springs are not shown in this Figure. Both intermediate side discs 16, 17 are provided with the axially aligned windows 26, 27. These windows 26, 27 extend in circumferential direction and are coextensive with the respective compressional springs 12, 13. The windows 29 in the output central plate 18 and the windows 28 in the input side plates 14, 15 are of such circumferential length as to receive the two compressional springs 12, 13 of the respective pair of compressional springs one behind the other in circumferential direction.

When the input side plates 14, 15 are loaded in counter-clockwise direction, as shown in FIG. 2, primarily the compressional springs 12 are loaded. These compressional springs 12 transmit circumferential force through the intermediate side discs 16, 17 and the compressional springs 13 onto the output central plate 18. The compressional springs 12 and 13 of each pair of compressional springs 12, 13 are arranged in series. The intermediate side discs 16, 17 have only the function of transmitting circumferential forces from the compressional springs 12 to the compressional springs 13. These intermediate side discs 16, 17 are not used for a further function. The intermediate side discs are interconnected by spacer rivets 25 such as to have a fixed distance from each other. The intermediate side discs 16, 17 are axially spaced from the output central plate 18 as well as from the input side plates 14, 15. As the intermediate side discs 16, 17 are only positioned by the compressional springs 12, 13 these intermediate side discs are subject only to a very small internal friction in operation because they have no contact wit both the output central plate 18 and the input side plates 14, 15. Accordingly, any uncontrollable friction is avoided. Friction is only obtained in a controlled way by the friction device 19 which can be exactly adjusted as to a value of friction torque.

From FIG. 2 one can further see that a terminal abutment system is provided. This terminal abutment system is accomplished in that the input side plates 14, 15 are provided with longitudinal slots 30 radially outwards of the compressional springs 12, 13 and that a radially extending nose 31 of the output central plate 18 engages into said longitudinal slots 30 which are provided in the input side plates 14, 15 where these input side plates approach and begin to contact each other.

Figure 3:
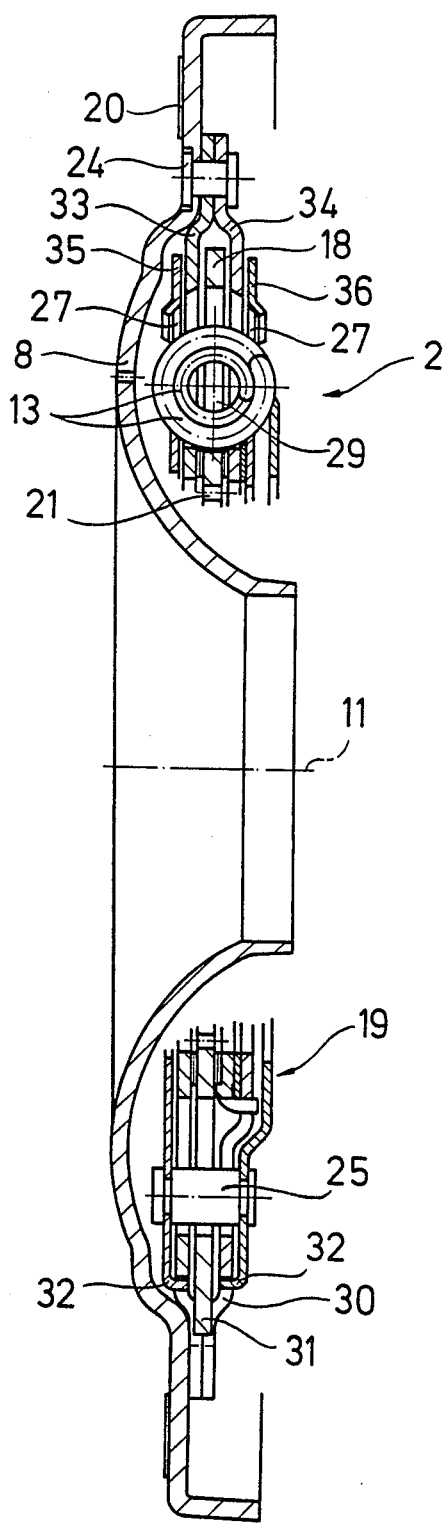
FIG. 3 shows a modified embodiment of a torsional vibration damper device of this invention, again integrated into a hydrodynamic torque converter.

In FIG. 3 there is shown a modification of the torsional vibration damper unit shown in FIGS. 1 and 2. The torsional vibration damper unit 2 of this embodiment is also connected with a piston 8 of a bridging clutch of a hydrodynamic torque converter. The difference between the two embodiments is to be found in the respective constructions of the torsional vibration damper unit. Again in FIG. 3 the output central plate 18 is located such as to have a central plane perpendicular to the axis 11 which coincides with the circumferentially extending axes of the compressional springs 12, 13. The input side plates 33, 34 follow however immediately on both sides of the output central plate 18 and the intermediate side discs 35, 36 are provided on the remote sides of the input side plates 33, 34. The operation is not modified by this constructional modification. It is however to be noted that due to this constructional modification radial space is saved as the friction device 19 operatively interconnected between the output central plate 18 and the input side plates 33, 34 can radially overlap the radially inner zones of the intermediate side discs 35, 36 when seen in axial direction. The intermediate side discs 35 and 36 are fixedly interconnected and spaced from each other by spacer rivets 25. These intermediate side discs 35,36 are positioned due to their windows 26, 27 with respect to the compressional springs 12, 13. Thus, also in this embodiment no uncontrolled friction can arise.

Moreover, it is to be noted in FIG. 3 that the intermediate side discs 35, 36 are provided in their radially outer zones with axially extending noses 32. These axially extending noses 32 are directed towards the input side plates 33, 34 and engage into the longitudinal slots 30. The noses 32 in cooperation with the longitudinal slots 30 define a further abutment system which becomes effective after a predetermined angular movement of the intermediate side discs 35, 36 with respect to the input side plates 33, 34. When this further abutment system becomes effective a break occurs in the line representing the elastic torque established by the springs 12, 13 in dependency of the angular deflection of the output central plate 18 and the input side plates 33, 34 relative to each other. This break is obtained because after this further abutment system has become effective only one compressional spring of each pair of compressional springs remains effective and this has the consequence that the above-mentioned line becomes steeper. Thus, it becomes possible to modify the above-mentioned line so as to be relatively flat when the two compressional springs of each pair are in series and as to be relatively steep when one single compressional spring of each pair of compressional springs is bridged by the further abutment system.

Figure 4:
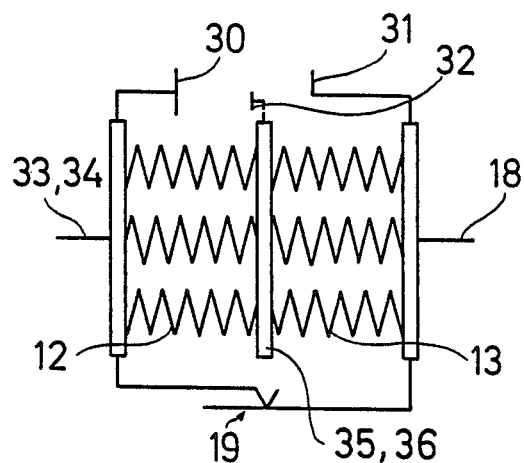
FIG. 4 is a functional illustration of a unit as shown in FIG. 3.

FIG. 4 shows a simplified schematic explanation of the behaviour of the torsional vibration damper device 2 of FIG. 3. The input side plates 33, 34 transmit a torque onto the compressional springs 12. These compressional springs 12 are supported by the intermediate side discs 35, 36 and the intermediate side discs 35, 36 transmit the torque through the compressional springs 13 onto the output central plate 18. Operatively interconnected between the input side plates 33, 34 and the output central plate 18 is the friction device 19. A first abutment system 30, 31 is provided between the input side plates 33, 34 and the output central plate 18. This first abutment system is established by the longitudinal slots 30 and the noses 31, as shown in FIG. 3. A further abutment system is established by the dotted noses 32 and the longitudinal slot 30. Within the range of angular movement which is defined by the noses 32 and the longitudinal slot 30 the above-mentioned characteristic line is relatively flat because the compressional springs 12, 13 of each pair of springs are operative in series. After the nose 32 has come into abutment with an end of the slot 30 only one compressional spring of each pair of compressional springs remains effective and the other one is bridged.

Figure 5:
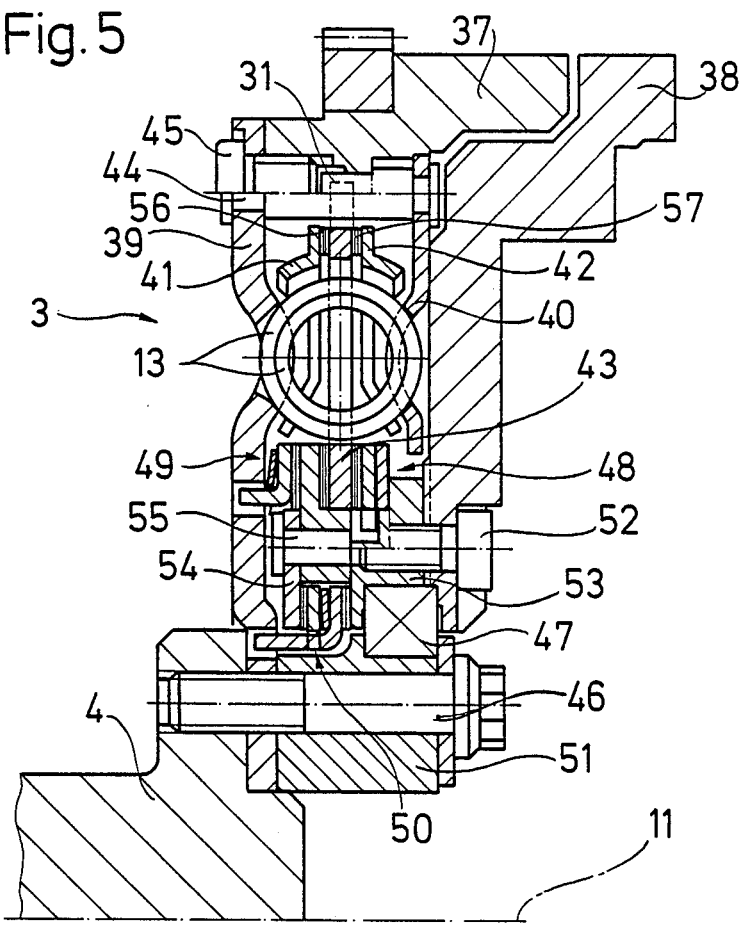
FIG. 5 shows the upper path of a longitudinal section of a two-part flywheel unit in which a torsional vibration damper device of this invention is integrated.

In FIG. 5 there is shown a torsional vibration damper unit 3 as integrated into a two-part flywheel unit. The primary flywheel 37 is fixed together with the input side plates 39, 40 and a bearing carrier ring 51 by bolts 46 to the crank shaft 4. Between the input side plates 39, 40 side discs 41 and 42 are provided which are floatingly positioned by the compressional springs 13. Between the intermediate side discs 41, 42 there is provided the output central plate 43. The arrangement of the windows in the input side plates 39, 40, the intermediate side discs 41, 42 and the output central plate 43 is identical with the arrangement in the afore-described embodiments. The secondary flywheel 38 is connected to the hub 53 by bolts 52. The hub 53 is rotatably mounted through a bearing 47 on the carrier ring 51. A starting and gear-changing clutch is connected with the secondary flywheel 38. This clutch is not illustrated. The connection between the primary flywheel 37 and the input side plates 39, 40 is accomplished by bolts 45. These bolts connect the input side plate 39 of increased wall thickness with the primary flywheel 37. The input side plates 39, 40 are interconnected by spacer rivets 44 and are maintained in a predetermined distance. The output central plate 43 is operatively connected with the hub 53 by a slipping clutch 48 which is located radially inward of the compressional springs. The components of the slipping clutch are fixed in axial direction by rivets 55. In the area of the slipping clutch 48 a friction device 49 is operatively provided between the hub 53 and the input side plate 39. A further friction unit 50 is provided radially inward of the rivets 55 in operative position between the hub 53 and the input side plate 39. An angular movement limiting system is provided between the input side plates 39, 40 on the one hand and the output central plate 43 on the other hand, this angular movement limiting system comprising noses 31 cooperating with the spacer rivets 44. In the area radially outward of the compression spring spacer rings 56, 57 are provided between the intermediate side discs 41, 42 and the output central plate 43. These spacer rings 56, 57 are made of a material having a low frictional value.

These spacer rings can be used when, due to narrow space, the axial movability of the intermediate side discs is to be limited. In such case positioning of the intermediate side discs in radial direction is obtained by the helical compressional springs and positioning in axial direction is achieved by the spacer rings 56,57.

Figure 6:
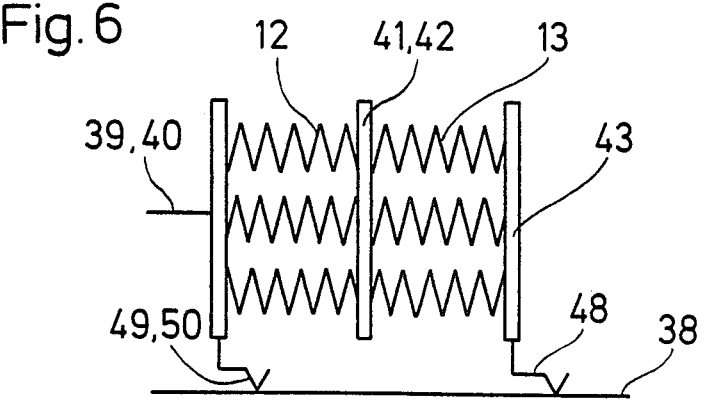
FIG. 6 shows an operational illustration for the embodiment of FIG. 5.

In FIG. 6, the function of the device of FIG. 5 is illustrated in simplified form. The helical compression springs 12, 13 are arranged in series with the intermediate side discs 41, 42 being arranged between them. The frictional units 49, 50 are provided between the input side plates 39, 40 on the one hand and the secondary flywheel 38 on the other hand. Further, the slipping clutch 48 is provided between the output central plate 43 and the secondary flywheel 38. The slipping torque of the slipping clutch 48 is adjusted such that it is only overcome when the torsional vibration damper unit 3 has been bridged by the noses 31 and the spacer rivets 44.

It is well to be understood that the torsional vibration damper unit of this invention can also be used in a clutch disc of a conventional starting and gear-changing clutch.

While specific embodiments of the invention have been shown and described in detail to illustrate the application of the inventive principles, it will be understood that the invention may be embodied otherwise without departing from such principles.

The reference numerals in the claims, if any, are only used for facilitating the understanding and are by no means restrictive.

What is claimed is:

1. A torque transmitting torsional vibration damper device, particularly for use in a torque transmission path of a motor vehicle between an engine and a gear box, comprising a first torque transmission unit (18) and a second torque transmission unit (14, 15) having a common axis, each of said torque transmission units (18; 14, 15) being provided with at least two circumferentially extending windows (29; 28), respective windows (29; 28) of said first torque transmission unit (18) and said second torque transmission unit (14, 15) being substantially aligned in axial direction in non-loaded condition of said torsional vibration damper device, each group of mutually aligned windows (29; 28) receiving a pair of torque transmitting compressional spring units (12, 13) arranged in series and spaced in circumferential direction, an intermediate torque transmission unit (16, 17) common to said pairs of compressional spring units (12, 13) being provided for circumferential force transmission between mutually adjacent ends of the compressional spring units (12, 13) of each pair, said intermediate torque transmission unit (16, 17) being supported in radial direction only by engagement with said compressional spring units (12, 13), said intermediate torque transmission unit (16, 17)) comprising (26, 27) receiving respective single compressional spring units of said pairs of compressional units (12 13).

said first torque transmission unit (18) comprising a central annular plate member (18) having a middle plane perpendicular to said axis, said middle plane substantially coinciding with circumferentially extending axes of said compressional spring units (13), said second torque transmission unit (14, 15) comprising two mutually interconnected side plates (14, 15) on both sides of said central plate (18), said intermediate torque transmission unit (16, 17) provided on both sides of said central plate (18), said side discs (16, 17) being located axially between respective sides of said central plate (18) and respective side plates (14, 15), said device being part of a clutch unit used for bridging a pump wheel (5) and a turbine wheel (7) of a hydrodynamic torque converter, said central plate (18) being provided with tooth means (21) being axially movably engaged with complementary tooth means (19) of said turbine wheel (7), said side plates (14, 15) being fixed at a location radially outward of said compressional spring units to a piston unit (8), said piston unit being provided with a clutch surface (20) engageable with a counter clutch surface of a part of said hydraulic torque converter which is connected for common rotation with said pump wheel (5), said side plates (14, 15) being bent towards each other adjacent said location, bent portions of said side plates (14, 15) being commonly fixed to said piston unit (8), a friction device (19) being provided between mutually axially opposite faces of said control member (18), and said side plates (14, 15) adjacent said tooth means (18), said side discs (16, 17) being free of radial contact with said bent portions and said friction device (19).

2. A device as set forth in claim 1, said windows (28; 28; 26, 27) being substantially equidistantly distributed along a circumferential line about said axis.

3. A device as set forth in claim 1, said intermediate torque transmission unit being axially supported only by engagement with said compressional springs.

4. A device as set forth in claim 1, said intermediate torque transmission unit being axially supported by one of said first and said second torque transmission units, low friction contact means being provided between said intermediate torque transmission unit and the respective one of said first and said second torque transmission units.

* * * * *